United States Patent [19]
Donini

[11] 3,852,422

[45] Dec. 3, 1974

[54] LONG-ACTIVE GONADOTROPINS

[75] Inventor: Pietro Donini, Rome, Italy

[73] Assignee: Istituto Farmacologico Serono S.p.A., Rome, Italy

[22] Filed: Nov. 30, 1971

[21] Appl. No.: 203,486

[30] Foreign Application Priority Data

June 26, 1971 Italy ................................. 26333/71
July 30, 1971 Italy ................................. 52011/71

[52] U.S. Cl. ................. 424/100, 424/105, 424/108, 424/179, 424/178

[51] Int. Cl. ..................... A61k 17/00, A61k 17/06

[58] Field of Search .......... 424/105, 108, 100, 179, 424/178

[56] References Cited
UNITED STATES PATENTS

2,734,016    2/1956    Holtermann ...................... 424/179

FOREIGN PATENTS OR APPLICATIONS

1,019,383    10/1962    Great Britain ..................... 424/108

*Primary Examiner*—Sam Rosen
*Attorney, Agent, or Firm*—Ostrolenk, Faber, Gerb & Soffen

[57] ABSTRACT

Long-active gonadotropins such as human menopausal gonadotropin, human chorionic gonadotropin, human pituitary gonadotropin, pregnant mare serum, and mixtures thereof are obtained from solutions in the form of a precipitation product with zinc hydroxide or aluminum hydroxide. Injectable preparations containing such long-active gonadotropins are also provided, which are useful for treating disorders of the functions of the genitals.

10 Claims, No Drawings

LONG-ACTIVE GONADOTROPINS

BACKGROUND OF THE INVENTION

The gonadotropic hormones presently used in therapy are mainly those of human origin, i.e., HPG (human pituitary gonadotropin) which is extracted from autopstic human hypophyses, and HMG (human menopausal gonadotropin) which is extracted from human urine of the menopause. Both HPG and HMG are mixtures of two hormones, the follicle-stimulating hormone (FSH) and the luteinizing hormone (LH), in a proportion of about 1:1.

Another hormone which is used in therapy is HCG (human chorionic gonadotropin) which originates from placenta and is extracted from human urine of the pregnancy.

Although it has been widely demonstrated that gonadotropins extracted from animal (ovine, equine, and so on) hypophyses or from pregnant mare serum (PMSG or pregnant mare serum gonadotropin) rapidly give rise to neutralizing antibodies when injected in a human being, such gonadotropins, particularly PMS, are still used in therapy.

During the last ten years the two human gonadotropic hormones FSH and LH, both of hypophyseal and urinary origin, as well as HCG, PMS and animal hypophyseal gonadotropins, have been isolated and purified. The purification of the various kinds of gonadotropins, when carried out to achieve homogeneous glycoproteins, permitted these hormones to be chemically, physically, biologically and immunologically characterized.

It has been ascertained that, in order to obtain a complete biological effect on both male and female receptor organs (testicle and ovary), a combined action of the two hormones FSH and LH is required, said hormones being used in variable proportions during the menstrual cycle whereas their proportions is almost constant in the man.

The chorionic gonadotropin (HCG) is mainly used in therapy because of its biological activity which is very similar to that of LH.

The gonadotropic hormones of human origin are known to be of importance in the therapy of both male and female sterility due to relative or absolute hypophyseal insufficiency or to a low reactivity of the target organs to the hypophyseal gonadotropic stimulation.

The availability of human hypophyseal FSH and LH, human urinary FSH, and HCG and PMS, in a proteic homogeneity state and, therefore, in the highest purity, as well as the possibility of using the same hormones made radioactive with $^{125}I$ or $^{135}I$, permitted that the half-lives of the said hormones as well as their clearance and disappearance rates to be measured. It has been ascertained that while PMS is rather slowly eliminated, the remaining gonadotropins, that is FSH, LH and HCG, have a very short half-life.

Therefore, it is very desirable to have said hormones long-lasting in a human or animal body when injected for experimental or therapeutical purposes. In other words, it is very desirable that an injected dose of hormone would be slowly released.

Among the advantages which could result from the availability of long-activity gonadotropins, the following can be mentioned:

1. a better utilization of the injected hormone by the target organs (ovary, testicle) and, therefore, a saving of the active substance which has been injected for therapeutical purposes; and 2. a likely decrease of the ovary hyper-stimulations due to administration of an excessive does or to an anomalous sensibility of the ovary. In fact, it is known that the proper dose of HPG or HMG is difficult to administer in treating female sterility since the response to any specific dose can vary from one patient to another and, unfortunately, the difference between an ineffective dose and a dose liable to cause serious disturbances due to ovary hyper-stimulations is very small. However, when long-acting gonadotropins are used, a gradual release of the active substance results; the ovary is not subjected to an intense and rapid stimulation, but rather to a slow and gradual stimulation, which is close to the natural or physiological action.

Since 1965, several authors, amongst which A. Albert and E. Rosemberg should be particularly mentioned, have studied the biological characteristics of several gonadotropins of human (hypophysary and urinary) or animal origin, made insoluble in aqueous solvents through a treatment with tannic acid.

In the following articles by A. Albert et al., the HPG used is the subject of my copending application Ser. No. 36,434, filed May 11, 1970, which is a continuation-in-part application of Ser. No. 614,749 filed on Feb. 8, 1967 which is in turn a continuation-in-part application of Ser. No. 285,489 filed on June 4, 1963, titled "Procedure for Obtaining Pituitary Gonadotropic Hormones From Urine":

1. "Assay Characteristics of Tannate Complexes of Human Pituitary Gonadotropin", Endocrinology 77: 226, 1965

2. "Effect of Tannation of Human Pituitary Gonadotropin as Determined by General Gonadotropin Assays", Endocrinology 77: 766, 1965

3. "Characteristics of Tannate Complexes of Human Pituitary Gonadotropin in the Follicle-Stimulating Assay", Endocrinology 77: 943, 1965.

Further works by the above mentioned authors include:

1. "Effect of Tannation of Ovine Follicle Stimulating Hormone", E. Rosemberg, Endocrinology 79: 149, 1966, wherein ovine hypophysary FSH is subjected to tannation.

2. "Effect of Tannation of Human LH", A. Albert and E. Rosemberg, Endocrinlogy 77: 588, 1965, wherein the characteristics of tannated human hypophyseal LH are investigated.

3. "Assay Characteristics of Tannate Complexes of Ovine Gonadotropins", A. Albert et al, Endocrinology 76: 139, 1965.

4. "Duration of Response to Free and Tannated Luteinizing Hormone", A. Albert et al., Endocrinology, 76: 259, 1965, wherein tannated ovine hyphyseal FSH and LH are investigated.

5. "Assay Characteristics of Tannate Complexes of Pregnant Mare Serum Gonadotropin", A. Albert et al., Endocrinology 76: 506, 1965.

In the foregoing references, the biological effects of gonadotropins of various origins made insoluble through tannation have been investigated in comparison with those of the same non-tannated, water-soluble gonadotropins. The reported results are negative as far as FSH is concerned, whereas a moderate retardation has been shown for luteinizing hormone.

Another attempted approach to retardation has been that of using polyvinylpyrrolidone and gelatin solutions at various concentrations as solvents for human gonadotropins (HMG, HPG and HCG). However, completely negative results have been obtained.

Belgium Pat. No. 624,529 discloses an injectable gonadotropin having prolonged action in which the gonadotropin is complexed with Zn.

Accordingly, it is an object of this invention to provide long-acting gonadotropins. It is another object of this invention to provide injectable pharmaceutical preparations suitable for treating disorders of the functions of the genitals. A further object of this invention is to provide a process for preparing long-active gonadotropins. These an other objects become apparent to those skilled in the art from the following description.

SUMMARY OF THE INVENTION

This invention relates to gonadotropins.

More particularly, the invention relates to long-active gonadotropins, injectable pharmaceutical preparations suitable for treating disorders of the functions of the genitals and a process for preparing long-active gonadotropins.

DETAILED DESCRIPTION OF THE INVENTION

In general, the long-active gonadotropins of this invention are prepared by dissolving the hormone in water or a physiological saline at room temperature (15° to 25° C.); adding an aqueous solution containing a soluble salt of zinc or aluminum, preferably zinc or aluminum chloride; adding an aqueous solution containing a buffering salt, preferably sodium acetate; diluting to the desired volume; and adding an aqueous alkali solution, preferably 0.1 N NaOH solution, to reach a pH of 7.1 to 7.4. Under such conditions, an off-white precipitate of zinc or aluminum hydroxide (precipitation component) and proteic hormone (gonadotropin) forms.

In accordance with the invention, the long-activity gonadotropins can also be prepared by adding to the first prepared aqueous solution of the hormone, an aqueous solution of $ZnCl_2$ or $AlCl_3$, sodium acetate and protamine sulfate in such proportions that a precipitate forms upon adjusting pH to 7.1 – 7.4 with 0.1 N NaOH.

The precipitation product of this invention can be recovered either by filtration or centrifugation. The recovered product can then be dried with acetone, absolute ethanol and the like, or lyophilized.

In accordance with the invention, it has been surprisingly discovered that when gonadotropins having high biological activities are used (human urinary FSH with 700 to 1200 I.U./mg.; HCG or PMS having a specific activity of about 3000 I.U./mg.), a long-acting gonadotropin cannot be obtained unless a protein concentration of at least 2 mg/ml is reached in the solution from which the precipitate is to be formed. For this purpose, in such cases a supplemental amount of human albumin has been added.

As used herein, "I.U." means the International Unit adopted by the World Health Organization on the basis of the 2nd International Reference Preparation (2nd IRP) for the biological titration of gonadotropins. For example, 1 I.U.-HMG is equivalent to 0.2295 mg of the 2nd IRP-HMG as supplied by the Biological Standards Department, National Institute for Medical Research, The Ridgeway, Mill Hill, London, N.W. 7.

The methods used for showing the retardation of the various gonadotropins are based on the determination of either the activities of the FSH, LH and HCG hormones separately, or of a mixture of FSH and LH as can be found in HPG, HMG or PMS preparations used in therapy in the form of injectable solutions.

As is known, the follicle-stimulating (FSH) and luteinizing (LH and HCG) biological activities can be quantitatively determined, even in extracts which are mixtures of the two hormones (FSH and LH/HCG), by using specific methods for either biological activity.

The specific method for FSH activity used herein is that of S. L. Steelman and F. M. Pohley, Endocrinology 53: 604, 1953. A specific method for LH activity used herein is that of Van Hell et al., Acta Endocr. 47: 409, 1964. Another specific method used herein is the Ovarian Ascorbic Acid Depletion (O.A.A.D.) described in A.F. Parlow, Human Pituitary Gonadotropins, page 300, Albert Editor, Published by Charles C. Thomas (1961). For determining the combined biological activities of the two FSH and LH hormones, that is, the total gonadotropic activity in the mixture of FSH and LH (HPG,HMG,PMS and animal hypophyseal extracts), a method has been used which is based on the ovary and uterus weight increase of 21 day old, impuberal, female rats.

In general, the comparison between the biological activities of free (soluble in water or physiological saline) and retarded (long-activity) gonadotropins has been effected by subcutaneously administering to each rat a specific dose of hormone(s) in a single injection and killing the animals 2, 4, 6 or 8 days after the administration. At the same time, groups of control animals have been injected with physiological saline and killed after the same time periods have elapsed.

In order to better show the difference between the biological activities of gonadotropins administered in free (soluble in water or physiological saline) and insoluble (e.g., zinc and protamine-zinc) forms, the following more sophisticated method has been employed. To a substrate consisting of relatively purified HMG (about 35 I.U.-FSH/mg. and 30 I.U.-LH/mg.) or human albumin, highly purified human urinary FSH (900 I.U.-FSH/mg. and 3.0 I.U.-LH/mg.) labeled with 125I is added. After radioiodination has experimentally shown not to have altered the FSH biological activity, such amounts of labeled FSH (FSH*) solution are added to the substrate (HMG or human albumin) that each rat receives a radioactivity dose of 2,000,000 cpm (counts per minute). The solutions containing the substrate plus FSH* are injected subcutaneously in the impuberal 21 day old rats in free (soluble) and retarded (e.g., zinc and protamine-zinc) forms, respectively. The animals are then killed after various periods of time, that is, 30 minutes, 1 hour, 2 hours, 4 hours, 8 hours, 24 hours and 48 hours, have elapsed. The radioactivity (FSH*) is then determined in several organs, specifically: in female rats — blood, ovary, kidney, liver, spleen and thyroid; in male rats — blood, testicle, kidney, liver, spleen, thyroid, seminal vesicle and ventral prostate.

Although aware that impuberal, 21 to 30 day old rats have very little amounts of endogeneous FSH and LH gonadotropins, the response of female and male target organs (ovary and testicle) of impuberal rats which have been hypophysectomized on the 21st day is investigated, in order to achieve a more reliable demonstration of the difference existing between the "biological activity versus time" patterns of free and retarded gonadotropins.

In the Examples which follow the below-listed preparations having gonadotropic activity have been employed:

| HMG, lot P-56E261C | : FSH (Steelman-Pohley) 35 I.U./mg.<br>LH (O.A.A.D.) 30 I.U./mg. |
| --- | --- |
| HPG, lot E266B | : FSH (Steelman-Pohley) 30 I.U./mg.<br>LH (O.A.A.D.) 70 I.U./mg. |
| HCG, lot 100 | : (Van Hell et al)<br>3136 I.U./mg. |
| lot 479771 | : (French Pharmacopoeia 8th Ed.)<br>1160 I.U./mg. |
| Human urinary FSH,<br>lot E234terB-4 | : FSH (Steelman-Pohley) 900 I.U./mg.<br>LH (radioimmunological)<br>3 I.U./mg. |

In the following Examples 1 to 9, two aqueous stock solutions (a) and (b) have been used, stock solution (a) containing 2.23 g. $ZnCl_2$ per 15.56 ml. or 68.695 mg. Zn per ml. and stock solution (b) containing 13.6% (w/v) sodium acetate trihydrate or 136 mg. sodium acetate per ml.

EXAMPLE 1

To 50 mg. HMG (Pergonal) dissolved in 10 ml physiological saline, 0.6869 mg Zn as $ZnCl_2$ and 6.8 mg $NaC_2H_3O_2.33H_2O$ per mg HMG were added. The solution pH was adjusted to 7.3 with 0.1 N NaOH and the suspension volume was brought to 25 ml with physiological saline.

The same amount of HMG (50 mg) was dissolved in physiological saline and diluted to 25 ml.

At the same time, 20 mg HCG were made insoluble by adding thereto, per each mg. hormone, Zn, $NaC_2H_3O_2.3H_2O$ and NaOH in proportions identical with those used for HMG.

The same amount of HCG was dissolved in physiological saline. To 20 randomized groups, each composed of 5-21 day old rats, 30 I.U.-FSH (HMG)+80 I.U.-HCG, 30 I.U.-FSH(HMG-Zn)+80 I.U.-HCG(HCG-Zn), 80 I.U.-HCG dissolved in physiological saline and 1 ml physiological saline were respectively administered in single subcutaneous injections.

The animals were killed 2, 4, 6 or 8 days after the injections. The results are shown in Table 1.

EXAMPLE 2

50 mg HMG (Pergonal) were dissolved in physiological saline and the volume was brought to 25 ml.

To 50 mg HMG (Pergonal) dissolved in 10 ml physiological saline, 0.6869 mg ZN as $ZnCl_2$ and 6.8 mg $NaC_2H_3O_2.3H_2O$ per mg HMG were added. The solution pH was adjusted to 7.3 with 0.1 N NaOH and the suspension volume was brought to 25 ml with physiological saline.

No chorionic gonadotropin was injected with HMG; therefore, the ovary and uterus weight increase was exclusively due to the combined FSH and LH activities.

Single subcutaneous injections were effected. The animals were killed 2, 4, 6, or 8 days after the injections. The results are shown in Table 2.

EXAMPLE 3

93.5 mg HMG (Pergonal) were dissolved in physiological saline and the volume was brought to 46.2 ml.

To 93.5 mg HMG (Pergonal) dissolved in 10 ml physiological saline, 0.6869 mg Zn as $ZnCl_2$ and 6.8 mg $NaC_2H_3O_2.3H_2O$ per mg HMG were added. The solution pH was adjusted to 7.3 with 0.1 N NaOH and the suspension volume was brought to 46.2 ml with physiological saline.

To 93.5 mg HMG (Pergonal) dissolved in 10 ml physiological saline, 0.322 mg protamine sulfate and 0.46 mg Zn as $ZnCl_2$ per mg HMG were added. The solution pH was adjusted to 7.1 with 0.1 N NaOH. The resulting suspension was then diluted to 46.2 ml with physiological saline.

Single subcutaneous injections were effected. The animals were killed 2, 4, 6 or 8 days after the injections. The results are shown in Table 3.

EXAMPLE 4

Male 21 day old rats were injected with the same solution and the same suspensions of HMG-Zn and HMG-protamine-Zn of Example 3 in order to investigate the retardation effect obtained on the luteinizing hormone.

Single subcutaneous injections were effected. The animals were killed 2, 4, 6 or 8 days after the injections. The results are shown in Table 4.

EXAMPLE 5

58 mg HPG were dissolved in physiological saline and the volume was brought to 29 ml.

To 58 mg HPG dissolved in 12 ml physiological saline, 0.6869 mg Zn as $ZnCl_2$ and 6.8 mg $NaC_2H_3O_2.3H_2O$ per mg HPG were added. The solution pH was adjusted to 7.3 with 0.1 N NaOH and the suspension volume was brought to 29 ml with physiological saline.

To 58 mg HPG dissolved in 12 ml physiological saline, 0.322 mg protamine sulfate and 0.046 mg Zn as $ZnCl_2$ were added. The solution pH was adjusted to 7.1 with 0.1 N NaOH and the volume was brought to 29 ml with physiological saline.

Single subcutaneous injections were effected. The animals were killed 2, 4, 6 or 8 days after the injections. The results are shown in Table 5.

EXAMPLE 6

Male 21 day old rats were injected with the same solution and the same suspensions of HPG-Zn and HPG-protamine-Zn of Example 5 in order to investigate the retardation effect obtained on the luteinizing hormone.

Single subcutaneous injections were effected. The animals were killed 2, 4, 6 or 8 days after the injections. The results are shown in Table 6.

EXAMPLE 7

9.3 mg HCG (3136 I.U./mg) were dissolved in 58.3 ml physiological saline.

To 3.6 ml of this stock solution, 60 mg crystallized human albumin dissolved in 8 ml physiological saline were added. The resulting solution was diluted to 30 ml with physiological saline.

To 3.6 ml stock solution, 60 mg crystallized human albumin dissolved in 8 ml physiological saline were added and then 0.6869 mg Zn as ZnCl₂ and 6.8 mg NaC₂H₃O₂.3H₂O per mg protein were added. The solution pH was adjusted to 7.3 with 0.1 N NaOH and the suspension volume was brought to 30 ml.

Single subcutaneous injections were effected in male 21 day old rats which were then killed 2, 4, 6, 8 or 10 days after the injections. The results are shown in Table 7.

EXAMPLE 8

51.5 mg HMG (Pergonal) dissolved in 10 ml physiological saline (carrier) plus 9.768 $\mu$g FSH* (tracer), equivalent to 60,000,000 cpm (counts per minute), were diluted to 30 ml with physiological saline.

To 51.5 mg HMG (Pergonal) dissolved in 10 ml physiological saline plus 9.768 $\mu$g FSH*, equivalent to 60,000,000 cpm, 0.6869 mg Zn as ZnCl₂ and 6.8 mg NaC₂H₃O₂.3H₂O per mg HMG were added. The solution pH was adjusted to 7.3 with 0.1 N NaOH and the suspension volume was brought to 30 ml with physiological saline.

To 51.5 mg HMG (Pergonal) dissolved in 10 ml physiological saline plus 9.768 $\mu$g FSH*, equivalent to 60,000,000 cpm, 0.322 mg protamine sulfate, 0.6869 mg Zn as ZnCl₂ and 6.8 mg NaC₂H₃O₂.3H₂O per mg HMG were added. The suspension pH was adjusted to 7.1 with 0.1 N NaOH. The suspension was then diluted to 30 ml with physiological saline.

Single subcutaneous injections equivalent to 2,000,000 cpm FSH* were effected in male and female 21 day old rats. The animals were killed 30 minutes, 1 hour, 2, 4, 8, 24 or 48 hours after the injection. The radioactivity of the drawn and weighed organs was measured. The results are shown in Tables 8a and 8b.

EXAMPLE 9

110 mg HMG (Pergonal) were dissolved in a physiological saline and diluted to 55 ml.

To 110 mg HMG (Pergonal) dissolved in 20 ml physiological saline, 0.6869 mg Zn as ZnCl₂ and 6.8 mg NaC₂H₃O₂.3H₂O per mg HMG were added. The solution pH was adjusted to 7.3 with 0.1 N NaOH and the suspension volume was brought to 55 ml with physiological saline.

To 110 mg HMG (Pergonal) dissolved in 20 ml physiological saline, 0.6869 mg Zn as ZnCl₂ and 0.322 mg protamine sulfate per mg HMG were added. The solution pH was adjusted to 7.1 with 0.1 N NaOH. The resulting suspension was then diluted to 55 ml with physiological saline.

In female and male rats which had been hypophysectomized on the 21st day, single subcutaneous injections were effected 3 days after the hypophysectomia. The animals were killed 2, 4, 6 or 8 days after the injections. The results are shown in Tables 9a and 9b.

Since gonadotropins are not stable in aqueous solution, a stable pharmaceutical preparation should contain them in a lyophilized form. The following Example 10 shows a typical stable pharmaceutical preparation.

EXAMPLE 10

3.5 ml ampoule (1) containing a specific amount of sterilized and lyophilized gonadotropin (HMG, HPG, HCG, PMS and so on), on 10 mg lactose as inert carrier;

1 ml ampoule (2) containing ZnCl₂ and sodium acetate in a suitable volume of aqueous sterile solution, in the proportions of 0.6869 mg Zn and 6.8 mg sodium acetate per mg of protein present in ampoule (1);

1 ml ampoule (3) containing such a volume of sterilized 0.1 N NaOH that a suspension pH of 7.1 to 7.4 be reached upon addition of the same to the solution obtained by dissolving the material contained in ampoule (1) in the retarding solvent contained in ampoule (2).

The resulting suspension should be instantly injected intramuscularly.

It is pointed out in the Belgium Pat. No. 624,529 that about 3 mg of zinc is the maximum tolerable dose which can be administered in a single injection. In said patent, one to two mg zinc per mg gonadotropin was used. As shown below, it had now been discovered that employing zinc in an insufficient amount to precipitate all of the gonadotropin will result in an effective retarded preparation.

In the following experiments, the inorganic precipitating agent (ZnCl₂ or AlCl₃) has been used in gradually varied amounts with respect to the protein, and the corresponding amounts of residual protein in the supernatant layer after precipitation have been determined. The following Examples illustrate that a relationship exists between the amounts of precipitating agent and the corresponding residual amounts of protein in the supernatant. Therefore, for sake of clarity, the quantitative ranges will be defined herein with reference to the obtained results, that is, they will be expressed as the amount of inorganic precipitating agent which cause the presence of the indicated percentage of protein in the supernatant layer after the operation illustrated in the Examples have been effected.

On the basis of the results of the following Examples, it can be stated that a generally useful range of the protein percentages in the supernatant layer after centrifugation is of about 3% to 20%. At the lower limit of this range all the protein present is substantially in the precipitation product; at the upper limit, an amount of soluble protein higher than 20% corresponds to an injectable product wherein an excessive amount of nonretarded hormone is present. As used herein, the term "excessive amount" is not to be understood as being in connection with any harmful effects on human or animal organisms; it simply refers to a practical limit which has been established, beyond which a retarded (long-activity) hormone product is no more properly involved but rather a mixture of long-active and soluble hormones.

The preferred soluble protein percentages range from about 4% to 12%. Within the limits of this range, the soluble hormone amounts are not excessive as hereinbefore defined and, on the other hand, the presence of an amount of soluble hormone (which amount is more preferably of about 5%) in the injectable preparation is quite desirable. In fact, the injection of a suspension of the precipitation product) in a medium containing 4% to 12% soluble hormone meets the twofold purpose of an immediate administration of the hormone and of a subsequent, long-lasting administration of the same, and is therefore of great therapeutic utility.

The amounts of inorganic precipitation agent corresponding to the above mentioned preferred amounts of residual soluble proteins, as apparent from the following Examples, is about 0.4 to 0.7 mg Zn per mg gonadotropin and about 0.9 to 1.4 mg Al per mg gonadotropin.

In the Examples which follow, the determination of the soluble protein has been effected by obtaining the percentage value from the value of the extinction coefficient on a diagram drawn by using solutions of known concentrations. The extinction coefficient has been determined by means of a cell of 1 cm. thickness and a wavelength of 280 millimicrons. The readings have been taken against controls having $E_{\lambda\,280\,m\mu}^{1cm}=$ 0.02 and 0.035 in Examples 11 to 16 and in Examples 17 to 19, respectively.

EXAMPLE 11

To 50 mg HMG (Pergonal) dissolved in 10 ml physiological saline, 1.717 mg Zn as $ZnCl_2$ and 6.8 mg $NaC_2H_3O_2 \cdot 3H_2O$ per mg HMG were added. The solution pH was adjusted to 7.3 with 0.1 N NaOH and the volume of the resulting suspension was brought to 25 ml with physiological saline.

After centriguation, the supernatant only contained trace amounts of free proteins.

EXAMPLES 12 to 16

The procedure of Example 11 was repeated except that different amounts of Zn as $ZnCl_2$ were employed. The obtained results are listed hereinbelow (the results of Example 11 are reproduced):

| EXAMPLE | mg Zn per mg HMG | Free proteins in the supernatant layer (% based on total proteins) |
|---|---|---|
| 11 | 1.717 | trace |
| 12 | 1.3758 | 1.2% |
| 13 | 0.6869 | 4% |
| 14 | 0.5151 | 7% |
| 15 | 0.412 | 12.5% |
| 16 | 0.3434 | 16% |

EXAMPLE 17

To 50 mg HMG (Pergonal) dissolved in 10 ml physiological saline, 1.4 mg Al as $AlCl_3$ and 6.8 mg $NaC_2H_3O_2 \cdot 3H_2O$ per mg HMG were added. The solution pH was adjusted to 7.4 with 0.1 N NaOH and the volume of the resulting suspension was brought to 25 ml with physiological saline.

After centrifugation, the supernatant contained about 3.8% free proteins.

EXAMPLES 18 and 19

The procedure of Example 17 was repeated except that different amounts of Al as $AlCl_3$ were employed. The obtained results are listed hereinbelow (the results of Example 17 are repeated):

| EXAMPLE | mg Al per mg HMG | Free proteins in the supernatant layer (% based on total proteins) |
|---|---|---|
| 17 | 1.4 | 3.8% |
| 18 | 0.7 | 20% |
| 19 | 0.35 | 70% |

From the preceding Examples in can be noted that the amount of Al should be almost twice as those of Zn, the precipitating and, therefore, the retarding effect on the hormone being equivalent. Consequently, the use of a zinc salt as the precipitation agent is preferred to the use of an aluminum salt.

EXAMPLE 20

The suspension of Example 15 was injected, in single dose, in impuberal, 21 day old rats. The experimental particulars and the results are reported in the following Table 10. From the data of the Table, even a relatively low amount of zinc (0.412 mg Zn as $ZnCl_2$ per mg HMG) appears to be capable of giving rise to a product having a substantially retarded activity with respect to completely soluble HMG.

TABLE 1

| 30 IU-FSH(HMG) +80 IU-HCG | 30 IU-FSH(HMG-Zn) +80 IU-HCG-Zn | 80 IU-HCG-Zn | 80 IU-HCG | Physiological saline | Autopsy after X days |
|---|---|---|---|---|---|
| Ovary mg | Ovary mg | Ovary mg | Ovary mg | Ovary mg | |
| 58.3 | 75.4 | 32.7 | 29.7 | 11.2 | |
| 54.7 | 75.8 | 40.6 | 25.5 | 14.4 | |
| 41.6 | 60.3 | 32.4 | 35.8 | 7.4 | |
| 66.5 | 67.8 | 26.4 | 23.8 | 15.5 | 2 |
| 49.0 | 56.5 | 29.0 | 27.4 | 9.2 | |
| *54.0 | 67.2 | 32.3 | 28.4 | 11.5 | |
| 56.1 | 82.4 | 28.0 | 33.8 | 13.8 | |
| 40.3 | 88.4 | 32.5 | 14.0 | 12.2 | |
| 78.4 | 62.8 | 33.2 | 29.0 | 9.3 | |
| 59.3 | 86.8 | 27.1 | 17.5 | 8.9 | 4 |
| 74.8 | 77.6 | 33.6 | 23.5 | 11.0 | |
| *61.8 | 79.6 | 30.9 | 23.5 | 11.0 | |
| 72.5 | 79.8 | 28.7 | 28.4 | 12.6 | |
| 44.5 | 54.3 | 18.3 | 28.8 | 12.8 | |
| 60.1 | 54.6 | 17.3 | 29.9 | 13.0 | |
| 51.4 | 74.0 | 23.6 | 19.9 | 9.4 | 6 |
| 58.5 | 65.7 | 30.7 | 14.4 | 11.9 | |
| *57.4 | 65.7 | 23.7 | 24.3 | 11.9 | |
| 45.8 | 59.2 | 24.3 | 24.5 | 20.2 | |
| 38.1 | 90.2 | 27.3 | 28.8 | 24.5 | |
| 33.2 | 59.0 | 32.8 | 19.5 | 24.0 | |
| 23.4 | 51.7 | 28.0 | 22.0 | 15.2 | 8 |
| 28.6 | 38.3 | 23.4 | 23.0 | 15.4 | |
| *33.8 | 59.7 | 27.1 | 23.6 | 19.9 | |

* Average

TABLE 2

| 60 IU-FSH+51.6 IU-LH(HMG) Ovary mg | 60 IU-FSH+51.6 IU-LH(HMG-Zn) Ovary mg | Physiological saline Uterus mg | Physiological saline Ovary mg | Autopsy after X days |
|---|---|---|---|---|
| 29.6 | 42.8 | 31.7 | 11.2 | |
| 40.4 | 41.0 | 14.2 | 14.4 | |
| 24.1 | 71.7 | 30.3 | 7.4 | |
| 33.8 | 52.0 | 73.8 | 15.5 | 2 |
| 29.9 | 38.0 | 33.2 | 9.2 | |
| *29.6 | 49.1 | 36.6 | 11.5 | |
| 42.1 | 81.7 | 15.7 | 13.8 | |
| 45.5 | 58.8 | 18.3 | 12.2 | |
| 33.9 | 56.9 | 17.1 | 9.3 | |
| 37.9 | 59.6 | 19.0 | 8.9 | |
| 26.7 | 51.6 | 16.3 | 11.0 | 4 |
| *37.2 | 61.7 | 17.2 | 11.0 | |
| 53.2 | 53.4 | 19.1 | 12.6 | |
| 38.6 | 49.5 | 32.0 | 11.9 | |
| 36.2 | 100.0 | 20.5 | 12.8 | |
| 39.5 | 48.9 | 20.1 | 13.0 | 6 |
| 41.2 | 60.8 | 22.9 | 9.4 | |
| *41.7 | 62.5 | 22.9 | 11.9 | |
| 21.0 | 123.3 | 29.5 | 20.2 | |
| 39.7 | 79.0 | 22.9 | 24.5 | |
| 13.7 | 75.0 | 19.5 | 24.0 | |
| 59.1 | 40.6 | 23.5 | 15.2 | 8 |
| 17.0 | 42.2 | 20.0 | 15.4 | |
| *30.1 | 72.0 | 23.0 | 19.9 | |

* Average

TABLE 3

| 60 IU-FSH+51.6 IU-LH(HMG) | | 60 IU-FSH+51.6 IU-LH(HMG-Zn) | | 60 IU-FSH+51.6 IU-LH(HMG-protamine-Zn) | | Physiological saline | | Autopsy after X days |
|---|---|---|---|---|---|---|---|---|
| Uterus mg | Ovary mg | Uterus mg | Ovary mg | Uterus mg | Ovary mg | Uterus mg | Ovary mg | |
| 63.0 | 20.4 | 76.5 | 44.4 | 74.8 | 46.4 | 23.7 | 9.6 | |
| 80.0 | 25.4 | 66.4 | 48.8 | 75.5 | 48.0 | 23.2 | 8.4 | |
| 74.8 | 37.9 | 64.0 | 38.5 | 81.4 | 45.5 | 23.4 | 7.0 | |
| 67.3 | 39.2 | 74.7 | 37.1 | 61.6 | 52.0 | 23.0 | 14.0 | 2 |
| 52.5 | 38.1 | 74.3 | 54.0 | 71.8 | 45.3 | 13.9 | 11.3 | |
| *67.5 | 32.2 | 71.2 | 44.6 | 73.0 | 47.4 | 21.4 | 10.1 | |
| 57.0 | 54.1 | 69.7 | 51.6 | 74.6 | 65.0 | 25.0 | 10.9 | |
| 86.5 | 18.5 | 73.0 | 37.7 | 87.0 | 68.0 | 21.4 | 13.2 | |
| 46.6 | 34.0 | 83.0 | 68.0 | 88.1 | 62.0 | 15.2 | 11.7 | |
| 59.4 | 43.8 | 64.0 | 61.3 | 98.3 | 85.0 | 28.0 | 9.1 | |
| 60.0 | 38.5 | 86.6 | 62.4 | 77.6 | 77.8 | 16.2 | 9.4 | 4 |
| *61.9 | 37.6 | 75.3 | 56.2 | 85.1 | 71.6 | 21.2 | 10.9 | |
| 49.4 | 53.3 | 63.7 | 42.7 | 136.0 | 77.0 | 33.0 | 13.7 | |
| 73.0 | 55.3 | 72.9 | 86.8 | 110.8 | 71.0 | 26.6 | 13.7 | |
| 68.8 | 35.8 | 70.9 | 58.4 | 95.0 | 81.3 | 19.6 | 11.3 | |
| 49.8 | 35.4 | 60.1 | 46.7 | 96.4 | 59.7 | 23.5 | 12.7 | |
| 45.9 | 23.3 | 72.6 | 28.9 | 97.0 | 44.2 | 17.5 | 8.7 | 6 |
| *57.3 | 40.6 | 68.0 | 52.7 | 107.1 | 66.6 | 24.0 | 12.0 | |
| 37.1 | 16.3 | 68.5 | 85.1 | 173.8 | 50.0 | 15.0 | 8.7 | |
| 32.2 | 13.0 | 72.2 | 92.8 | 134.4 | 122.6 | 18.3 | 12.1 | |
| 33.7 | 13.3 | 82.2 | 51.6 | 117.1 | 33.8 | 14.0 | 13.6 | |
| 71.7 | 36.6 | 33.6 | 28.0 | 142.7 | 77.8 | 20.3 | 15.6 | |
| 52.4 | 19.6 | 53.5 | 53.4 | 131.6 | 26.0 | 14.0 | 11.6 | 8 |
| *45.4 | 19.8 | 62.0 | 62.2 | 139.9 | 62.0 | 16.3 | 12.3 | |

* Average

TABLE 4

| 60 IU-LH+70 IU-FSH(HMG) Seminal Vesicles - mg | 60 IU-LH+70 IU-FSH(HMG-Zn) Seminal Vesicles - mg | 60 IU-LH+70 IU-FSH(HMG-protamine-Zn) Seminal Vesicles - mg | Physiological saline Seminal Vesicles - mg | Autopsy after X days |
|---|---|---|---|---|
| 22.9 | 25.6 | 43.5 | 15.7 | |
| 13.8 | 36.6 | 24.0 | 13.5 | |
| 14.9 | 18.0 | 29.6 | 12.8 | |
| 18.4 | 16.3 | 31.6 | 10.1 | 2 |
| 11.0 | 23.9 | 20.6 | 8.1 | |
| *16.2 | 24.1 | 29.9 | 12.0 | |
| 27.6 | 40.2 | 33.4 | 10.0 | |
| 19.1 | 30.4 | 51.2 | 11.0 | |
| 21.4 | 30.7 | 47.0 | 11.2 | |
| 17.1 | 41.1 | 50.3 | 11.0 | 4 |
| 24.2 | 31.4 | 40.4 | 13.1 | |
| *21.8 | 34.8 | 44.5 | 11.9 | |
| 20.6 | 31.5 | 35.0 | 14.0 | |
| 29.6 | 31.0 | 46.5 | 13.1 | |
| 22.0 | 35.8 | 53.5 | 11.5 | 6 |
| 16.2 | 15.6 | 24.0 | 13.0 | |
| *22.8 | 29.0 | 38.2 | 12.7 | |
| 31.3 | 26.0 | 33.3 | 10.2 | |
| 21.5 | 26.5 | 34.6 | 5.0 | |
| 10.4 | 25.2 | 61.6 | 14.7 | |
| 27.0 | 52.0 | 40.2 | 12.7 | 8 |
| 15.8 | 35.4 | 37.2 | 11.9 | |
| *21.2 | 33.0 | 41.4 | 10.9 | |

* Average

TABLE 5

| 60 IU-FSH+140 IU-LH(HPG) | | 60 IU-FSH+140 IU-LH(HPG-Zn protamine-Zn) | | 60 IU-FSH+140 IU-LH(HPG-saline) | | Physiological saline | | Autopsy after X days |
|---|---|---|---|---|---|---|---|---|
| Uterus mg | Ovary mg | Uterus mg | Ovary mg | Uterus mg | Ovary mg | Uterus mg | Ovary mg | |
| 90.4 | 32.0 | 85.6 | 61.3 | 90.2 | 48.0 | 21.0 | 15.4 | |
| 75.3 | 36.0 | 82.3 | 88.6 | 75.3 | 30.6 | 20.4 | 16.0 | |
| 72.6 | 48.5 | 91.5 | 46.2 | 84.7 | 50.7 | 24.1 | 10.1 | |
| 103.0 | 38.3 | 79.8 | 57.0 | 82.4 | 46.2 | 16.8 | 13.2 | 2 |
| 74.1 | 33.7 | 82.4 | 62.7 | 67.9 | 24.0 | 16.8 | 9.0 | |
| *83.1 | 36.5 | 84.3 | 63.2 | 80.2 | 39.9 | 19.8 | 12.7 | |
| 68.2 | 31.9 | 111.0 | 61.7 | 105.3 | 49.0 | 19.6 | 14.6 | |
| 53.5 | 35.3 | 167.7 | 126.8 | 85.2 | 48.0 | 20.8 | 9.7 | |
| 53.0 | 26.1 | 111.9 | 145.2 | 75.2 | 37.9 | 13.5 | 10.0 | |
| 80.8 | 35.7 | 147.5 | 109.6 | 64.8 | 42.0 | 25.1 | 11.0 | 4 |
| 69.2 | 48.0 | 131.0 | 138.0 | 75.7 | 28.7 | 17.2 | 11.0 | |
| *64.9 | 35.4 | 133.8 | 116.3 | 81.2 | 41.1 | 19.2 | 11.3 | |
| 56.5 | 41.4 | 236.4 | 160.0 | 52.7 | 68.0 | 21.0 | 10.0 | |
| 48.2 | 21.0 | 144.3 | 147.5 | 53.8 | 44.6 | 22.8 | 8.8 | |
| 58.7 | 64.5 | 186.8 | 147.0 | 45.2 | 32.3 | 17.5 | 9.0 | |
| 41.1 | 17.4 | 197.8 | 153.0 | 34.9 | 20.6 | 23.2 | 19.2 | 6 |
| 37.7 | 31.3 | 225.6 | 130.0 | 47.6 | 20.0 | 13.1 | 10.0 | |
| *48.4 | 35.1 | 198.2 | 146.2 | 46.8 | 33.1 | 19.5 | 11.4 | |
| 48.7 | 15.8 | 219.5 | 183.3 | 40.8 | 13.9 | 15.9 | 8.3 | |
| 34.9 | 23.5 | 227.5 | 120.1 | 47.7 | 18.8 | 17.1 | 9.4 | |
| 38.8 | 13.2 | 220.3 | 165.9 | 32.8 | 29.8 | 18.0 | 8.0 | |
| 45.9 | 15.5 | 246.8 | 185.0 | 36.8 | 16.9 | 17.0 | 10.0 | 8 |
| 29.9 | 10.8 | 220.6 | 142.7 | 69.9 | 60.2 | 17.5 | 10.0 | |
| *39.6 | 15.8 | 226.9 | 159.4 | 45.5 | 27.9 | 17.1 | 9.1 | |

* Average

TABLE 6

| 60 IU-LH+22.8 IU-FSH(HPG) | 60 IU-LH+22.8 IU-FSH(HPG-Zn) | 60 IU-LH+22.8 IU-FSH(HPG-protamine-Zn) | Physiological saline | Autopsy after X-days |
|---|---|---|---|---|
| Seminal Vesicles - mg | Seminal Vesicles - mg | Seminal Vesicles - mg | Seminal Vesicles - mg | |
| 12.9 | 21.2 | 22.3 | 20.7 | |
| 20.0 | 19.7 | 21.2 | 14.3 | |
| 31.2 | 19.1 | 24.0 | 6.8 | |
| 23.2 | 15.4 | 20.0 | 12.0 | 2 |
| 17.7 | 27.6 | 21.0 | 7.3 | |
| *21.0 | 20.5 | 21.7 | 12.2 | |
| 21.7 | 47.8 | 18.0 | 13.0 | |
| 17.7 | 45.6 | 19.6 | 12.0 | |
| 30.3 | 41.8 | 22.0 | 10.0 | |
| 13.2 | 47.0 | 20.0 | 20.0 | 4 |
| 20.2 | 40.2 | 23.0 | 7.5 | |
| *20.6 | 44.5 | 21.7 | 12.5 | |
| 14.8 | 33.0 | 23.4 | 8.3 | |
| 14.8 | 33.3 | 22.0 | 14.4 | |
| 16.6 | 33.6 | 13.0 | 10.0 | |
| 13.0 | 48.2 | 17.5 | 11.3 | 6 |
| 15.6 | 29.9 | 15.0 | 10.6 | |
| *15.0 | 35.6 | 18.2 | 10.9 | |
| 15.7 | 19.4 | 17.6 | 12.6 | |
| 13.3 | 30.6 | 13.0 | 9.3 | |
| 16.7 | 24.0 | 12.6 | 8.1 | |
| 11.7 | 33.1 | 13.0 | 9.0 | 8 |
| 13.3 | 30.3 | 13.0 | 9.3 | |
| *14.1 | 27.5 | 13.8 | 9.7 | |

* Average

TABLE 7

| 60 IU-HCG in Physiological saline | 60 IU-HCG-Zn | Physiological saline | Autopsy after X days |
|---|---|---|---|
| Seminal Vesicles mg | Seminal Vesicles mg | Seminal Vesicles mg | |
| 26.1 | 26.0 | 9.9 | |
| 25.0 | 27.4 | 8.2 | |
| 16.7 | 27.8 | 15.1 | |
| 24.7 | 28.5 | 14.0 | 2 |
| 21.4 | 28.5 | 7.3 | |
| *22.8 | 27.6 | 10.9 | |
| 45.2 | 48.9 | 13.0 | |
| 27.8 | 45.0 | 8.1 | |

TABLE 7 – Continued

| 60 IU-HCG in Physiological saline Seminal Vesicles mg | 60 IU-HCG-Zn Seminal Vesicles mg | Physiological saline Seminal Vesicles mg | Autopsy after X days |
|---|---|---|---|
| 26.7 | 56.1 | 7.9 | |
| 40.4 | 38.5 | 15.6 | 4 |
| 26.7 | 42.0 | 10.3 | |
| *33.4 | 46.1 | 11.0 | |
| 32.8 | 84.0 | 10.8 | |
| 20.0 | 75.1 | 14.1 | |
| 31.9 | 88.4 | 16.0 | |
| 44.5 | 63.4 | 14.1 | 6 |
| 32.3 | 71.6 | 12.6 | |
| *32.3 | 76.5 | 13.5 | |
| 26.1 | 95.3 | 17.1 | |
| 19.2 | 102.5 | 5.6 | |
| 19.2 | 118.0 | 16.7 | |
| 25.7 | 99.4 | 23.0 | 8 |
| 28.4 | 76.6 | 23.3 | |
| *23.7 | 98.4 | 17.1 | |
| 21.5 | 159.2 | 23.3 | |
| 41.0 | 171.5 | 28.9 | |
| 16.4 | 149.4 | 16.5 | |
| 22.8 | 161.4 | 21.4 | 10 |
| 29.6 | 179.3 | 8.4 | |
| *26.2 | 165.8 | 19.7 | |

* Average

TABLE 8a

| HMG + FSH* | Ovary cpm/g | Blood cpm/g | Thyroid cpm/g | Spleen cpm/g | Liver cpm/g | Kidney cpm/g | Autopsy Hours |
|---|---|---|---|---|---|---|---|
| (1) | 5913 | 7190 | 143081 | 2621 | 7329 | 34088 | |
| (2) | 3669 | 1975 | 37870 | 1071 | 3991 | 5516 | 0.30 hr |
| (3) | 3763 | 2860 | 40389 | 1103 | 2436 | 7382 | |
| (1) | 5594 | 5405 | 348600 | 3398 | 6789 | 37236 | |
| (2) | 4990 | 2010 | 118051 | 1109 | 4646 | 7550 | 1 hr |
| (3) | 5356 | 3505 | 180409 | 1739 | 3385 | 10407 | |
| (1) | 6651 | 8740 | 379724 | 4860 | 9088 | 45287 | |
| (2) | 6997 | 2460 | 204859 | 1387 | 2761 | 11754 | 2 hr |
| (3) | 7826 | 4140 | 315375 | 2041 | 3837 | 14867 | |
| (1) | 9081 | 8985 | 1964160 | 5037 | 9214 | 44886 | |
| (2) | 5523 | 7060 | 507366 | 3007 | 6220 | 30318 | 4 hr |
| (3) | 4258 | 4610 | 612950 | 2774 | 4972 | 17768 | |
| (1) | 15389 | 12310 | 13341798 | 7819 | 14583 | 64147 | |
| (2) | 12456 | 10465 | 3010748 | 5535 | 10033 | 41687 | 8 hr |
| (3) | 12531 | 30575 | 2688541 | 3738 | 9275 | 29460 | |
| (1) | 10123 | 6525 | 21378225 | 3742 | 7066 | 25208 | |
| (2) | 10360 | 5575 | 13697852 | 3863 | 6591 | 25725 | 24 hr |
| (3) | 9107 | 4085 | 16219671 | 3193 | 5926 | 11627 | |
| (1) | 1371 | 1550 | 18634772 | 1476 | 4629 | 11680 | |
| (2) | 4323 | 2645 | 21981687 | 1080 | 3904 | 11965 | 48 hr |
| (3) | 4190 | 2235 | 21183444 | 2405 | 4152 | 7708 | |

(1) = HMG + FSH*
(2) = HMG-Zn + FSH*-Zn
(3) = HMG-protamine-Zn + FSH*-Zn

TABLE 8b

| HMG + FSH* | Testicles cpm/g | Blood cpm/g | Thyroid cpm/g | Spleen cpm/g | Liver cpm/g | Kidney cpm/g | Ventral Prostate cpm/g | Seminal Vesicles cpm/g | Autopsy after X hours |
|---|---|---|---|---|---|---|---|---|---|
| (1) | 1919 | 6920 | 297555 | 3311 | 6720 | 43339 | 3768 | 7158 | |
| (2) | 1682 | 3305 | 68988 | 1850 | 2749 | 9466 | 2871 | 6002 | 0.30 hr |
| (3) | 1128 | 3775 | 122102 | 1721 | 2650 | 8191 | 3449 | 4560 | |
| (1) | 3727 | 9995 | 1017230 | 4298 | 13420 | 59109 | 4393 | 7418 | |
| (2) | 1474 | 4000 | 231528 | 1904 | 3127 | 9826 | 3410 | 8129 | 1 hr |
| (3) | 1282 | 3720 | 283135 | 1948 | 3752 | 10646 | 3051 | 8619 | |
| (1) | 4307 | 9645 | 1395601 | 4799 | 11957 | 60766 | 7962 | 11198 | |
| (2) | 2118 | 3810 | 461511 | 2777 | 5030 | 19172 | 3295 | 8560 | 2 hr |
| (3) | 1690 | 3535 | 600099 | 2094 | 4301 | 14416 | 4415 | 8114 | |
| (1) | 4704 | 12485 | 3062409 | 4881 | 11796 | 62086 | 5073 | 8204 | |
| (2) | 3005 | 7420 | 1361463 | 3157 | 6141 | 30105 | 3963 | 7268 | 4 hr |
| (3) | 2360 | 6920 | 714556 | 3065 | 6701 | 18596 | 3699 | 8915 | |
| (1) | 10424 | 22060 | 18580034 | 9996 | 12305 | 53476 | 9787 | 24961 | |
| (2) | 6143 | 12315 | 7430523 | 4760 | 8400 | 33942 | 7724 | 13128 | 8 hr |
| (3) | 5379 | 9255 | 10346863 | 5995 | 8922 | 25380 | 7016 | 12877 | |
| (1) | 4720 | 6020 | 25296674 | 4075 | 7422 | 26273 | 7352 | 11490 | |
| (2) | 4623 | 5410 | 15592006 | 3270 | 6372 | 21485 | 6124 | 7998 | 24 hr |
| (3) | 5359 | 6270 | 14529365 | 4108 | 18124 | 6960 | 9314 | | |
| (1) | 1197 | 1670 | 27173741 | 1669 | 4190 | 11624 | 2975 | 9107 | |
| (2) | 989 | 1925 | 20161831 | 1259 | 3176 | 9452 | 2399 | 5792 | 48 hr |
| (3) | 978 | 1720 | 16536431 | 1281 | 3183 | 8064 | 2552 | 9479 | |

(1) = HMG + FSH*
(2) = HMG-Zn + FSH*-Zn
(3) = HMG-protamine-Zn + FSH*-Zn

TABLE 9a

| 60 IU-FSH+51.6 IU-LH(HMG) | | 60 IU-FSH+51.6 IU-LH(HMG-Zn) | | 60 IU-FSH+51.6 IU-LH(HMG+ protamine-Zn) | | Physiological saline | | after X days |
|---|---|---|---|---|---|---|---|---|
| Uterus mg | Ovary mg | Uterus mg | Ovary mg | Uterus mg | Ovary mg | Uterus mg | Ovary mg | |
| 27.1 | 15.6 | 28.4 | 18.2 | 27.1 | 13.0 | 14.2 | 5.1 | |
| 26.3 | 12.0 | 31.5 | 14.5 | 29.5 | 16.3 | 10.4 | 5.7 | |
| 25.2 | 17.5 | 34.8 | 13.3 | 32.6 | 38.3 | 11.6 | 5.9 | |
| 28.4 | 12.5 | 37.5 | 13.1 | 38.5 | 18.7 | 12.5 | 4.8 | 2 |
| 27.4 | 12.4 | 40.4 | 9.4 | 37.2 | 12.7 | 9.6 | 3.7 | |
| *26.8 | 14.0 | 34.5 | 13.7 | 33.2 | 19.8 | 11.6 | 5.0 | |
| 82.8 | 21.9 | 109.0 | 28.9 | 89.2 | 23.6 | 12.9 | 4.3 | |
| 62.7 | 13.9 | 97.8 | 28.1 | 128.4 | 33.0 | 16.1 | 5.0 | |
| 70.5 | 23.9 | 84.4 | 36.4 | 49.9 | 15.7 | 17.9 | 4.6 | |
| 91.7 | 15.7 | 94.0 | 45.5 | 76.4 | 33.4 | 11.8 | 4.0 | 4 |
| 85.0 | 18.1 | 105.1 | 25.2 | 81.0 | 28.5 | 12.2 | 4.2 | |
| *78.5 | 18.7 | 98.0 | 32.8 | 85.0 | 26.8 | 14.2 | 4.4 | |
| 69.5 | 9.8 | 104.5 | 25.5 | 102.5 | 21.7 | 17.8 | 5.0 | |
| 40.8 | 9.1 | 68.3 | 12.0 | 84.0 | 18.8 | 27.7 | 7.8 | |
| 61.2 | 17.0 | 112.7 | 21.0 | 67.7 | 14.0 | 23.4 | 3.1 | |
| 62.0 | 10.6 | 103.0 | 28.8 | 89.5 | 18.3 | 32.0 | 11.8 | 6 |
| 47.8 | 11.3 | 82.2 | 29.5 | 69.5 | 11.8 | 16.4 | 8.5 | |
| *56.3 | 11.6 | 94.1 | 23.3 | 82.6 | 16.9 | 23.4 | 7.2 | |
| 41.7 | 5.5 | 51.2 | 21.2 | 59.2 | 9.0 | 12.3 | 4.3 | |
| 42.0 | 14.3 | 63.5 | 40.2 | 76.3 | 12.4 | 18.0 | 4.3 | |
| 29.2 | 9.4 | 94.4 | 22.2 | 67.3 | 20.6 | 11.3 | 5.0 | |
| 33.5 | 9.1 | 61.3 | 26.6 | 51.5 | 58.8 | — | — | 8 |
| 36.2 | — | 64.6 | 37.1 | — | — | — | — | |
| *36.5 | 8.8 | 67.0 | 29.4 | 63.5 | 25.2 | 13.8 | 4.5 | |

* Average

TABLE 9b

| 60 IU-LH+70 IU-FSH (HMG) | | | 60 IU-LH+70 IU-FSH (HMG-Zn) | | | 60 IU-LH+70 IU-FSH (HMG-protamine-Zn) | | | Physiological saline | | | Autopsy after X days |
|---|---|---|---|---|---|---|---|---|---|---|---|---|
| Sem. Ves. mg | Ventr. Prost. mg | Test. mg | Sem. Ves. mg | Ventr. Prost. mg | Test. mg | Sem. Ves. mg | Ventr. Prost. mg | Test. mg | Sem. Ves. mg | Ventr. Prost. mg | Test. mg | |
| 7.0 | 18.3 | 144.2 | 6.2 | 21.4 | 283.9 | 6.2 | 20.9 | 198.3 | 11.0 | 18.5 | 196.7 | |
| 15.1 | 17.5 | 427.4 | 11.3 | 20.2 | 256.2 | 8.1 | 19.5 | 174.0 | 9.1 | 23.2 | 138.1 | |
| 11.5 | 21.4 | 265.6 | 14.0 | 19.6 | 316.2 | 8.8 | 18.4 | 203.4 | 8.1 | 15.4 | 123.1 | |
| 7.9 | 20.7 | 259.6 | 10.7 | 22.5 | 195.0 | 6.4 | 22.7 | 180.3 | 5.8 | 6.8 | 174.0 | 2 |
| 14.4 | 19.5 | 340.0 | 8.2 | 21.7 | 283.4 | 3.7 | 20.3 | 201.8 | 6.2 | 7.9 | 124.7 | |
| 11.3 | 19.5 | 287.4 | 10.0 | 21.1 | 266.9 | 6.6 | 20.3 | 191.8 | 8.0 | 14.3 | 151.3 | |
| 18.8 | 39.3 | 274.3 | 18.3 | 38.2 | 247.5 | 18.5 | 32.0 | 323.0 | 7.8 | 23.0 | 185.2 | |
| 9.4 | 37.1 | 381.5 | 18.8 | 26.6 | 226.1 | 11.8 | 41.5 | 196.8 | 5.0 | 24.3 | 98.0 | |
| 8.3 | 17.7 | 134.5 | 10.1 | 26.4 | 229.2 | 12.4 | 33.2 | 256.6 | 9.3 | 11.8 | 255.5 | |
| 17.5 | 43.0 | 274.2 | 10.6 | 32.0 | 196.7 | 17.2 | 27.4 | 223.7 | 6.3 | 4.1 | 214.0 | 4 |
| 12.3 | 30.0 | 175.8 | 17.0 | 26.4 | 222.8 | 12.6 | 27.4 | 316.7 | 4.5 | 3.0 | 91.7 | |
| 13.2 | 33.4 | 248.0 | 14.9 | 29.9 | 224.5 | 14.5 | 32.3 | 263.4 | 6.6 | 13.2 | 168.9 | |
| 13.3 | 21.8 | 214.5 | 28.3 | 33.1 | 304.7 | 8.1 | 30.8 | 243.0 | 7.1 | 5.1 | 87.0 | |
| 12.2 | 29.5 | 225.3 | 36.8 | 48.7 | 446.3 | 11.3 | 38.6 | 274.7 | 10.0 | 14.7 | 188.4 | |
| 10.3 | 12.4 | 179.0 | 17.5 | 32.6 | 259.8 | 14.0 | 43.2 | 250.7 | 6.0 | 5.8 | 99.1 | |
| 20.3 | 33.4 | 301.3 | 24.0 | 49.6 | 322.0 | 15.1 | 28.0 | 261.9 | 5.1 | 5.0 | 102.1 | 6 |
| — | — | — | 21.0 | 47.0 | 265.1 | 17.2 | 33.5 | 253.3 | — | — | — | |
| 14.0 | 24.2 | 230.0 | 25.5 | 42.2 | 319.5 | 13.1 | 34.8 | 256.7 | 7.0 | 8.6 | 119.1 | |
| 7.2 | 16.8 | 142.9 | 17.1 | 35.1 | 288.7 | 11.2 | 21.5 | 266.4 | 5.3 | 3.3 | 106.7 | |
| 4.7 | 24.8 | 170.1 | 17.2 | 27.8 | 296.3 | 9.6 | 32.0 | 250.4 | 3.3 | 3.1 | 210.0 | |
| 7.6 | 12.5 | 141.0 | 22.1 | 24.4 | 243.6 | 9.2 | 24.0 | 230.8 | 7.1 | 3.5 | 119.3 | |
| 6.7 | 9.8 | 157.9 | — | — | — | — | — | — | 6.7 | 13.9 | 82.6 | 8 |
| 10.4 | 10.6 | 244.3 | — | — | — | — | — | — | 4.7 | 3.7 | 105.6 | |
| 7.3 | 14.9 | 161.2 | 18.8 | 29.1 | 276.2 | 10.0 | 25.8 | 249.2 | 5.4 | 5.5 | 124.8 | |

TABLE 10

| Autopsy after X days | 60 IU-FSH+51.4 IU-LH (HMG) | | 60 IU-FSH+51.4 IU-LH (HMG - Zn) | | 60 IU-LH + 70 IU-FSH (HMG) | | | 60 IU-LH + 70 IU-FSH (HMG-Zn) | | |
|---|---|---|---|---|---|---|---|---|---|---|
| | Uterus mg | Ovary mg | Uterus mg | Ovary mg | Sem.Ves. mg | Ventr. Prost. mg | Testicles mg | Sem.Ves. mg | Ventr. Prost. mg | Testicles mg |
| | 93.0 | 44.6 | 108.4 | 60.1 | 18.1 | 29.8 | 423.8 | 23.6 | 39.5 | 357.5 |
| | 99.7 | 36.2 | 90.7 | 40.0 | 19.2 | 47.3 | 376.2 | 17.8 | 36.1 | 363.2 |
| 2 | 101.2 | 39.0 | 91.0 | 58.0 | 24.5 | 37.4 | 433.0 | 25.0 | 46.8 | 402.6 |
| | 97.2 | 32.5 | 103.2 | 45.7 | 21.3 | 55.8 | 460.8 | 23.3 | 46.0 | 318.1 |
| | 84.9 | 50.6 | 112.8 | 60.8 | 11.1 | 31.7 | 342.2 | 18.7 | 47.7 | 386.6 |
| Average | 95.3 | 40.6 | 101.2 | 52.9 | 18.8 | 40.4 | 405.2 | 21.7 | 43.2 | 365.6 |
| | 66.0 | 58.7 | 76.6 | 69.3 | 16.6 | 62.0 | 354.8 | 30.1 | 86.0 | 467.1 |
| | 57.0 | 66.6 | 74.0 | 82.5 | 26.9 | 58.3 | 458.1 | 22.0 | 53.0 | 443.0 |
| 4 | 63.2 | 42.1 | 92.8 | 95.6 | 23.1 | 62.3 | 472.0 | 19.5 | 62.9 | 484.4 |
| | 86.6 | 49.5 | 69.5 | 74.5 | 26.1 | 55.5 | 536.9 | 21.4 | 69.0 | 427.2 |

TABLE 10—Continued

| Autopsy after X days | 60 IU-FSH+51.4 IU-LH (HMG) | | 60 IU-FSH+51.4 IU-LH (HMG - Zn) | | 60 IU-LH + 70 IU-FSH (HMG) | | | 60 IU-LH + 70 IU-FSH (HMG-Zn) | | |
|---|---|---|---|---|---|---|---|---|---|---|
| | Uterus mg | Ovary mg | Uterus mg | Ovary mg | Sem.Ves. mg | Ventr. Prost. mg | Testicles mg | Sem.Ves. mg | Ventr. Prost. mg | Testicles mg |
| | 63.2 | 56.0 | 77.0 | 87.4 | 21.4 | 52.4 | 401.2 | 29.2 | 68.6 | 655.0 |
| Average | 67.2 | 54.6 | 78.0 | 81.9 | 22.8 | 58.1 | 444.6 | 24.4 | 67.7 | 495.3 |
| | 48.2 | 24.3 | 61.2 | 64.8 | 20.4 | 50.8 | 563.2 | 17.4 | 45.0 | 402.0 |
| | 67.8 | 14.2 | 52.8 | 52.9 | 20.8 | 53.6 | 520.8 | 18.6 | 47.7 | 462.0 |
| 6 | 51.8 | 34.3 | 50.8 | 41.7 | 9.2 | 46.1 | 445.5 | 18.4 | 57.7 | 383.9 |
| | 35.5 | 34.8 | 59.6 | 45.1 | 16.0 | 42.1 | 519.2 | 17.0 | 58.6 | 551.2 |
| | 60.0 | 77.0 | 54.0 | 62.0 | 18.7 | 47.0 | 427.4 | 25.4 | 86.4 | 744.5 |
| Average | 52.7 | 37.9 | 55.7 | 53.3 | 17.0 | 47.9 | 495.2 | 19.4 | 59.1 | 508.7 |
| | 80.7 | 68.2 | 78.4 | 106.8 | 16.4 | 39.5 | 496.2 | 32.5 | 70.5 | 747.5 |
| | 40.6 | 16.2 | 61.6 | 23.6 | 16.8 | 63.5 | 554.2 | 15.0 | 75.3 | 710.1 |
| 6 | 42.0 | 23.4 | 58.4 | 45.4 | 15.6 | 56.2 | 495.7 | 13.9 | 51.1 | 477.0 |
| | 54.1 | 18.2 | 86.3 | 71.5 | 26.8 | 41.3 | 722.0 | 23.8 | 62.4 | 680.2 |
| | 56.8 | 44.3 | 82.4 | 58.8 | 20.6 | 65.9 | 607.6 | 39.3 | 114.7 | 812.6 |
| Average | 54.8 | 34.1 | 73.4 | 61.2 | 19.2 | 53.2 | 575.1 | 24.9 | 74.8 | 685.4 |

What is claimed is:

1. An injectable pharmaceutical preparation suitable for treating disorders of the functions of the genitals comprising a suspension having pH 7.1–7.4 and containing a gonadotropin selected from the group consisting of human menopausal gonadotropin, human chorionic gonadotropin, human pituitary gonadotropin, pregnant mare serum, and mixtures thereof, 4–12 weight percent of said gonadotropin being in the form of soluble hormone in the supernatent and the remainder being in the form of a precipitation product of said gonadotropin and an inorganic precipitation component selected from the group consisting of zinc hydroxide in an amount corresponding to 0.4–0.7 mg Zn per mg gonadotropin and aluminum hydroxide in an amount corresponding to 0.9–1.4 mg Al per mg gonadotropin.

2. The injectable pharmaceutical preparation of claim 1 wherein said gonadotropin is said human menopausal gonadotropin and said inorganic precipitation component is zinc hydroxide.

3. The injectable pharmaceutical preparation of claim 1 wherein said gonadotropin is said human chorionic gonadotropin and said inorganic precipitation component is zinc hydroxide.

4. The injectable pharmaceutical preparation of claim 1 wherein said inorganic precipitation component is aluminum hydroxide.

5. The injectable pharmaceutical preparation of claim 1 wherein about 5% of said gonadotropin is in the form of soluble hormone.

6. A process for preparing in injectable pharmaceutical preparation of claim 1 comprising
   a. dissolving said gonadotropin in water or phsiological saline;
   b. adding a sodium acetate buffered solution of an inorganic salt selected from the group consisting of water soluble zinc and aluminum salts in an amount of 0.4–0.7 mg Zn and 0.9–1.4 mg Al, respectively, per mg gonadotropin the amount of zinc or aluminum salt being sufficient to precipitate an amount of said gonadotropin at a pH of 7.1–7.4 such that there is 4–12 weight percent soluble hormone in the supernatant; and
   c. adding a sodium hydroxide solution to reach a pH of 7.1–7.4.

7. The process for preparing the injectable pharmaceutical preparation of claim 6 wherein said gonadotropin is said human menopausal gonadotropin and said inorganic precipitation component is zinc hydroxide.

8. The process for preparing the injectable pharmaceutical preparation of claim 6 wherein said gonadotropin is said human chorionic gonadotropin and said inorganic precipitation component is zinc hydroxide.

9. The process for preparing the injectable pharmaceutical preparation of claim 6 wherein said inorganic precipitation component is aluminum hydroxide.

10. The process of claim 6 wherein the amount of zinc or aluminum salt employed is that sufficient to precipitate said gonadotropin such that there is about 5 weight percent soluble hormone in the supernatant.

* * * * *